United States Patent
Miyakoshi

(10) Patent No.: US 9,269,026 B2
(45) Date of Patent: Feb. 23, 2016

(54) RECOGNITION DICTIONARY CREATION APPARATUS AND RECOGNITION DICTIONARY CREATION METHOD

(71) Applicant: TOSHIBA TEC KABUSHIKI KAISHA, Shinagawa-ku, Tokyo (JP)

(72) Inventor: Hidehiko Miyakoshi, Miyagi-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/257,125

(22) Filed: Apr. 21, 2014

(65) Prior Publication Data

US 2014/0321715 A1    Oct. 30, 2014

(30) Foreign Application Priority Data

Apr. 25, 2013  (JP) ................................. 2013-092519

(51) Int. Cl.
  *G06K 9/00*  (2006.01)
  *G06K 9/62*  (2006.01)

(52) U.S. Cl.
  CPC .................... *G06K 9/6255* (2013.01)

(58) Field of Classification Search
  CPC .................................................. G06K 9/6255
  USPC .................................................. 382/110, 154
  See application file for complete search history.

(56) References Cited

U.S. PATENT DOCUMENTS

| 6,201,885 B1* | 3/2001 | Hodgson ................ G01B 11/28 209/576 |
| 6,282,508 B1 | 8/2001 | Kimura et al. |
| 2005/0286767 A1* | 12/2005 | Hager et al. ................ 382/190 |
| 2012/0298762 A1* | 11/2012 | Hasegawa ............ G07G 1/0045 235/494 |

FOREIGN PATENT DOCUMENTS

| JP | 10-260960 | 9/1998 | |
| JP | 2007034549 A * | 2/2007 | ............. G06F 17/60 |
| JP | 2007-072665 | 3/2007 | |
| JP | 2010-237886 | 10/2010 | |
| JP | 2012-247968 | 12/2012 | |

OTHER PUBLICATIONS

First Office Action for Japanese Patent Application No. 2013-092519 Dated Mar. 3, 2015, 4 pages.

* cited by examiner

*Primary Examiner* — Gregory F Cunningham
(74) *Attorney, Agent, or Firm* — Amin, Turocy & Watson, LLP

(57) ABSTRACT

In accordance with one embodiment, a recognition dictionary creation apparatus comprises an image capturing section, a measurement module, a specification module, an extraction module and a registration module. The image capturing section photographs a commodity at a distance away from the image capturing section to capture an image of the commodity. The measurement module measures the distance from the image capturing section to the commodity photographed by the image capturing section as a distance data. The specification module specifies the commodity from the captured image. The extraction module extracts an appearance feature amount of the commodity from the captured image. The registration module registers the appearance feature amount extracted by the extraction module in a recognition dictionary file in association with the distance data as a feature amount data of the specified commodity at the distance measured by the measurement module.

8 Claims, 11 Drawing Sheets

| | COMMODITY ID | COMMODITY NAME | UNIT PRICE | ...... | ds1 | ds2 | ds3 |
|---|---|---|---|---|---|---|---|
| 40 | 000001 | APPLE (FUJI) | 100 | ...... | X | X | X |
| | 000002 | WATERMELON | 500 | ...... | — | X | X |
| | 000003 | LEMON | 80 | ...... | ○ | ○ | ○ |
| | 000004 | ORANGE | 120 | ...... | X | ○ | X |
| | ⋮ | ⋮ | ⋮ | ⋮ | ⋮ | ⋮ | ⋮ |

FIG.10

UNREGISTERED COMMODITY LIST

| COMMODITY NAME | d1(5cm) | d2(15cm) | d3(30cm) |
|---|---|---|---|
| APPLE (FUJI) | X | X | X |
| WATERMELON | — | X | X |
| ORANGE | X | ○ | ○ |

END

FIG.11

UNREGISTERED COMMODITY LIST

| COMMODITY NAME | d1(5cm) | d2(15cm) | d3(30cm) |
|---|---|---|---|
| WATERMELON | — | X | X |
| ORANGE | X | ○ | ○ |
|  |  |  |  |

END

US 9,269,026 B2

RECOGNITION DICTIONARY CREATION APPARATUS AND RECOGNITION DICTIONARY CREATION METHOD

CROSS-REFERENCE TO RELATED APPLICATION

This application is based upon and claims the benefit of priority from Japanese Patent Application No. 2013-092519, filed Apr. 25, 2013, the entire contents of which are incorporated herein by reference.

FIELD

Embodiments described herein relate to a recognition dictionary creation apparatus used in a system which recognizes a commodity from an image obtained by photographing the commodity and a method for creating a recognition dictionary.

BACKGROUND

There is a technology in which an object is recognized from an image of the object captured by an image capturing section. In such a technology, an appearance feature amount of the object is extracted from the image and then compared with feature amount data of each reference image registered in the recognition dictionary to calculate a similarity degree of the feature amounts. Then, an object equivalent to the reference image having the highest similarity degree is recognized as the object photographed by the image capturing section. In recent years, it has been proposed to apply such an object recognition technology to a checkout system (POS system) of a retail store to recognize commodities purchased by a customer.

BRIEF DESCRIPTION OF THE DRAWINGS

FIG. 10 is a schematic view illustrating one example of a screen of an unregistered commodity list;

FIG. 11 is a schematic view illustrating one example of a screen of the unregistered commodity list;

DETAILED DESCRIPTION

In accordance with one embodiment, a recognition dictionary creation apparatus comprises an image capturing section, a measurement module, a specification module, an extraction module and a registration module. The image capturing section photographs a commodity at a distance apart from the image capturing section to capture an image of the commodity. The measurement module measures the distance from the image capturing section to the commodity photographed by the image capturing section as a distance data. The specification module specifies the commodity from the image of the commodity captured by the image capturing section. The extraction module extracts an appearance feature amount of the commodity from the image of the commodity captured by the image capturing section. The registration module registers the appearance feature amount extracted by the extraction module in a recognition dictionary file in association with the distance data as a feature amount data of the commodity, which is specified by the specification module, at the distance measured by the measurement module.

One embodiment of the recognition dictionary creation apparatus is described below with reference to the accompanying drawings.

In the present embodiment, a scanner apparatus 1 functioning as a commodity recognition apparatus of a store checkout system further has a function as a recognition dictionary creation apparatus.

Figure 1:
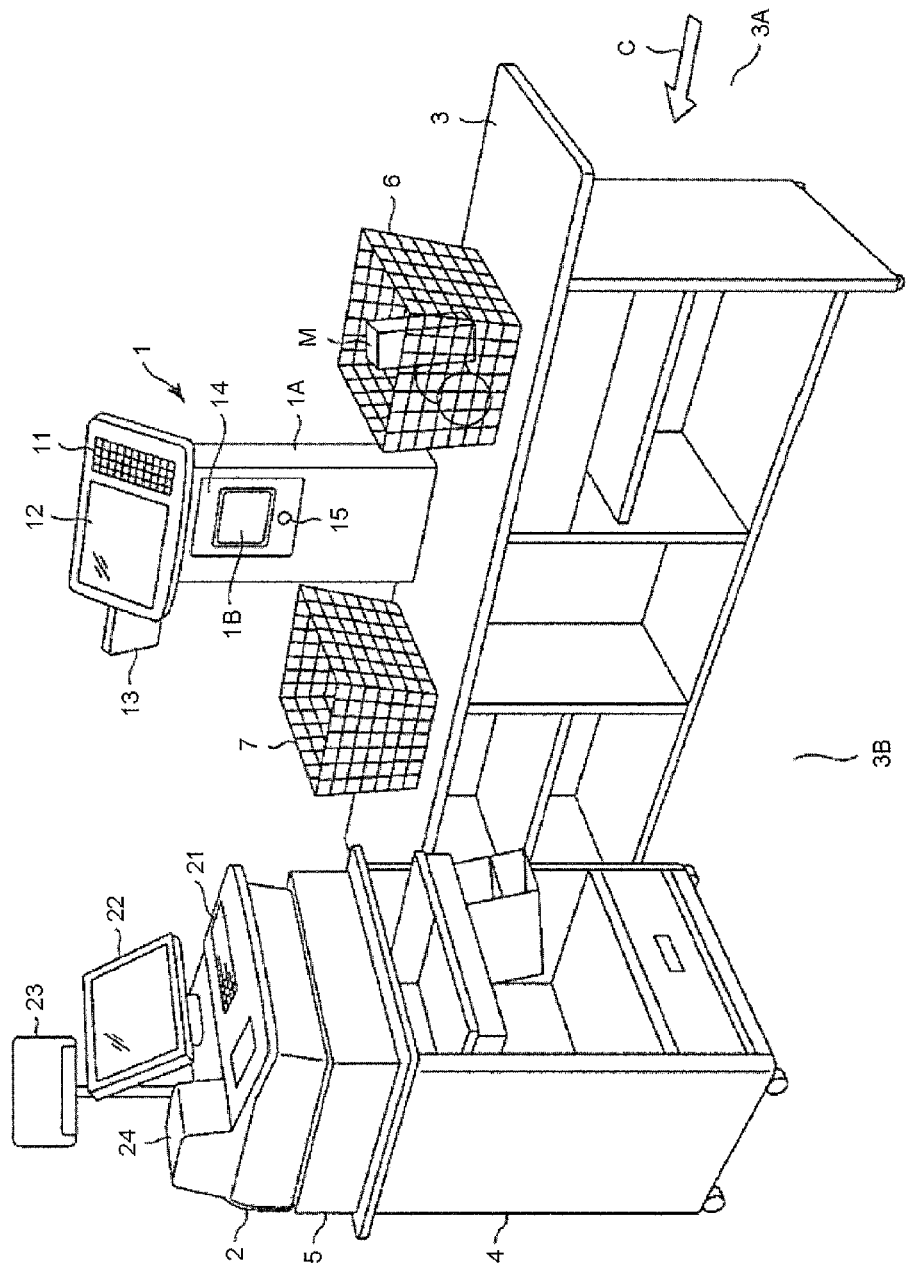
FIG. 1 is an external view of a store checkout system according to one embodiment.

FIG. 1 is an external view of a store checkout system. The system includes a scanner apparatus 1 acting as a registration section for registering a commodity purchased by a customer and a POS (Point Of Sales) terminal 2 acting as a settlement section for processing the payment by the customer. The scanner apparatus 1 is mounted on a checkout counter 3. The POS terminal 2 is arranged on a register table 4 through a drawer 5. The scanner apparatus 1 and the POS terminal 2 are electrically connected with each other through a communication cable 8 (refer to FIG. 2).

The scanner apparatus 1 comprises a keyboard 11, a touch panel 12 and a display for customer 13. Those display or operation devices (keyboard 11, touch panel 12 and display for customer 13) are attached to a thin rectangular-shaped housing 1A constituting a main body of the scanner apparatus 1.

An image capturing section 14 is installed in the housing 1A. A reading window 1B is formed in a rectangular shape at the front side of the housing 1A. The image capturing section 14 comprises a CCD (Charge Coupled Device) image capturing element acting as an area image sensor, a drive circuit thereof, and an image capturing lens for focusing the image of an image capturing area on the CCD image capturing element. The image capturing area refers to the area of a frame image which is focused on the CCD image capturing element through the image capturing lens from the reading window 1B. The image capturing section 14 outputs the image focused on the image capturing area of the CCD image capturing element through the image capturing lens. The area image sensor, which is not limited to the CCD image capturing element, may be, for example, a CMOS (complementary metal oxide semiconductor) device.

A distance sensor 15 serving as a measurement module is arranged nearby the reading window 15. The distance sensor 15 is used to measure a distance from the image capturing section 14 to the commodity photographed by the image capturing section 14. A well-known distance sensor such as a sensor formed by combining an infrared LED and a phototransistor or a sensor using ultrasonic or laser light may be applied as such a distance sensor 15.

The POS terminal 2 comprises a keyboard 21, a display for operator 22, a display for customer 23 and a receipt printer 24 as devices required for settlement.

The checkout counter 3 is arranged along a customer passage 3A. The register table 4 is arranged at a side opposite to the customer passage 3A with respect to the checkout counter 3 at a substantially right angle to the checkout counter 3. Specifically, the register table 4 is located at the end of the checkout counter 3 at the downstream side of the passage 3A in a movement direction of a customer indicated by an arrow C. Therefore, the checkout counter 3 and the register table 4 are arranged in an L-shape to define a space 3B for a shop clerk in charge of settlement, i.e., so called casher.

At the approximate center of the checkout counter 3, the housing 1A of the scanner apparatus 1 is vertically arranged such that the keyboard 11, the touch panel 12 and the reading window 1B are directed to the space for a shop clerk (cashier). The display for customer 13 of the scanner apparatus 1 is arranged on the housing 1A, facing to the customer passage 3A.

A first upper surface portion of the checkout counter 3 at the upstream side thereof through the scanner apparatus 1 in the customer movement direction serves as a space for placing a shopping basket 6 in which an unregistered commodity M purchased by a customer is held. On the other side, a second upper surface portion at the downstream side through the scanner apparatus 1 serves as an another space for placing a shopping basket 7 in which a commodity M registered by the scanner apparatus 1 is held.

Figure 2:
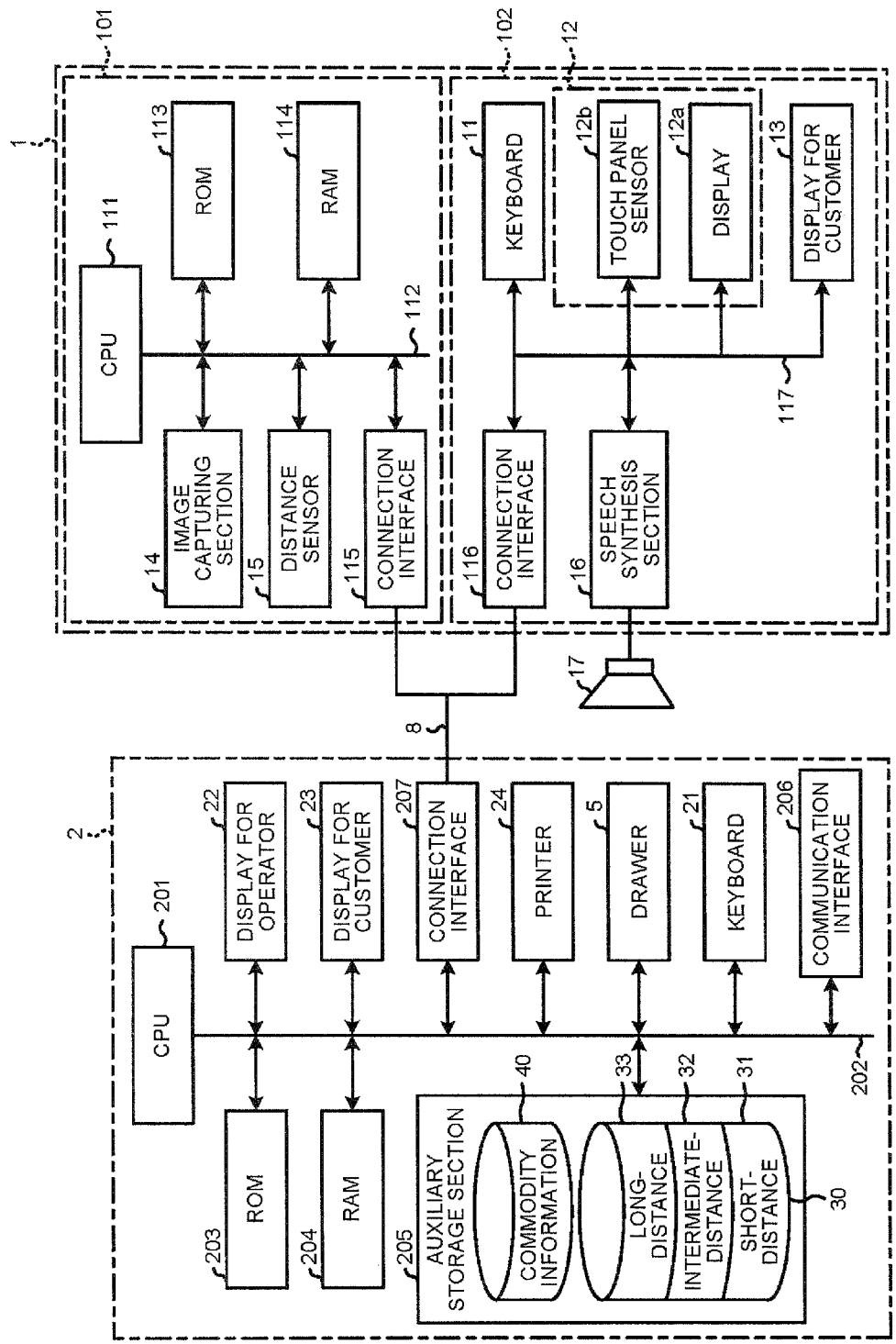
FIG. 2 is a block diagram illustrating the hardware constitutions of a scanner apparatus and a POS terminal.

FIG. 2 is a block diagram illustrating the hardware constitutions of the scanner apparatus 1 and the POS terminal 2. The scanner apparatus 1 comprises a scanner section 101 and an operation-output section 102. The scanner section 101 includes a CPU (Central Processing Unit) 111, a ROM (Read Only Memory) 113, a RAM (Random Access Memory) 114, a connection interface 115, the image capturing section 14 and the distance sensor 15 which are connected with each other via a bus line 112.

The CPU 111 is a central part of a computer. The CPU 111 controls each section to achieve various functions of the scanner apparatus 1 according to an operating system or an application program.

The ROM 113 is a main storage part of the computer. The ROM 113 stores the operating system and the application program mentioned above. As occasion demands, ROM 113 also stores data required to execute various processing by the CPU 111. The application program includes a recognition dictionary creation program and a commodity recognition program described later.

The RAM 114 is also a main storage part of the computer mentioned above. The RAM 114 stores data required to execute various processing by the CPU 111 as needed. Further, the RAM 114 is also used as a work area for the CPU 111 when various processing is executed.

The operation-output section 102 includes a connection interface 116, the keyboard 11, the touch panel 12, the display for customer 13 and a speech synthesis section 16 which are connected with each other via a bus line 117.

The touch panel 12 comprises a panel type display 12a and a touch panel sensor 12b overlaid on the screen of the display 12a.

The speech synthesis section 16 outputs a speech or voice signal to a speaker 17 in response to a command input via the bus line 117. The speaker 17 converts the voice signal into a voice to output it.

The POS terminal 2 also carries a CPU 201 as a main body of the control section. The CPU 201 is connected with a ROM 203, a RAM 204, an auxiliary storage section 205, a communication interface 206 and a connection interface 207 via a bus line 202. In addition, the keyboard 21, display for operator 22, display for customer 23, printer 24 and drawer 5 are respectively connected with the bus line 202 via an input-output circuit (not shown).

The communication interface 206 is connected with a store server (not shown) via a network such as a LAN (Local Area Network) and the like. Through this connection, the POS terminal 2 can perform a transmission/reception of data with the store server.

The connection interface 207 is connected with the two connection interfaces 115 and 116 of the scanner apparatus 1 via a communication cable 8. Through the connection, the POS terminal 2 receives information from the scanner section 101 of the scanner apparatus 1. In addition, the POS terminal 2 performs a transmission/reception of data signals with the keyboard 11, the touch panel 12, the display for customer 13 and the speech synthesis section 16 which constitute the operation-output section 102 of the scanner apparatus 1. On the other hand, the scanner apparatus 1 can access the data file stored in the auxiliary storage section 205 of the POS terminal 2 through this connection.

The auxiliary storage section 205, which is, for example, a HDD (Hard Disk Drive) device or a SSD (Solid State Drive) device, further stores data files such as a recognition dictionary file 30, a commodity information file 40 and the like, in addition to various programs. The recognition dictionary file 30 includes three kinds of files, i.e., a short-distance recognition dictionary file 31, an intermediate-distance recognition dictionary file 32 and a long-distance recognition dictionary file 33. In the following description, the three files of the short-distance recognition dictionary file 31, the intermediate-distance recognition dictionary file 32 and the long-distance recognition dictionary file 33 are collectively referred to as a distance-classified file.

Figures 3, 4:
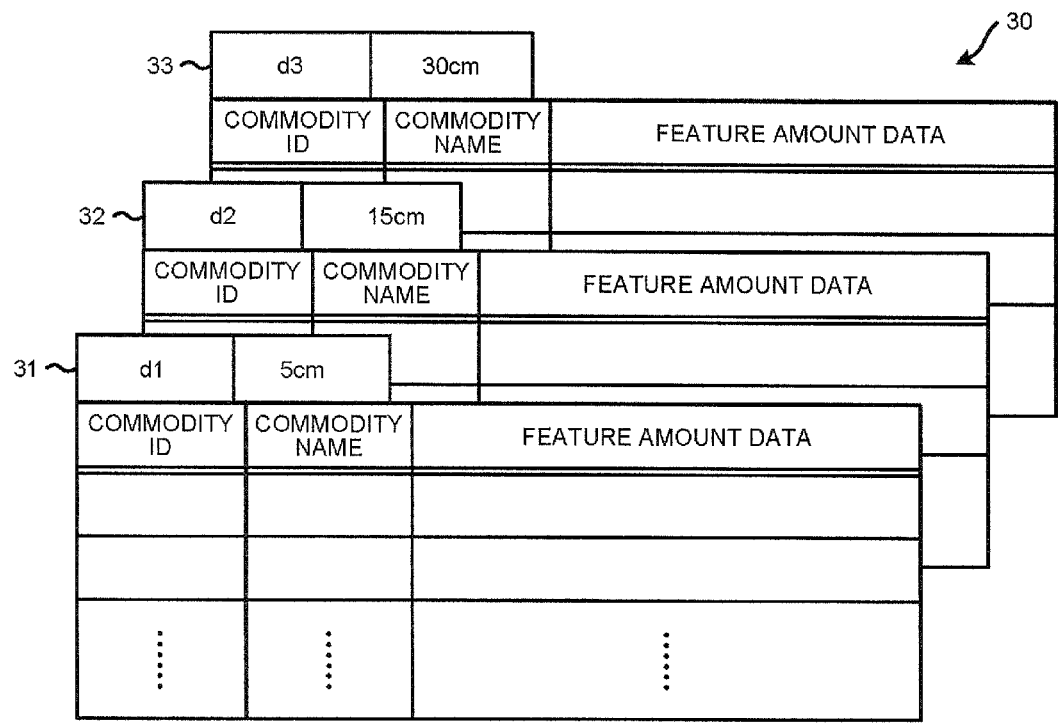
FIG. 3 is a schematic view illustrating the structure of data stored in a recognition dictionary file.
FIG. 4 is a schematic view illustrating the structure of data stored in a commodity information file.

FIG. 3 is a schematic view illustrating the structure of the data stored in the recognition dictionary file 30. As shown in FIG. 3, setting distances d1, d2 and d3 (d1<d2<d3) are respectively stored in each of the distance-classified files 31-33 of the recognition dictionary file 30 in advance. For example, "5 cm" is stored in the short-distance recognition dictionary file 31 as the setting distance d1, "15 cm" is stored in the intermediate-distance recognition dictionary file 32 as the setting distance d2, and "30 cm" is stored in the long-distance recognition dictionary file 33 as the setting distance d3.

Further, a plurality of recognition dictionary data including a commodity ID, commodity name and feature amount data are stored in each of the distance-classified files 31~33. The commodity ID is a unique code for distinguishing each commodity individually. The commodity name is the name of the commodity specified with the corresponding commodity ID. The feature amount data is obtained by extracting appearance feature amount serving as surface information (appearance shape, surface hue, pattern, concave-convex state and the like) of a commodity, which is recognized with the corresponding commodity ID, from a reference image obtained by photographing the commodity at a corresponding setting distances d1, d2 or d3 away from the image capturing section, and then representing the extracted appearance feature amount in the form of parameters.

The distance from the image capturing section 14 indicates an alienation distance from the reading window 1B. For example, the distance from the image capturing section 14 is 0 cm when the commodity is contacted with the reading window 1B. The distance from the image capturing section 14 increases as the commodity is moved away from the reading window 1B.

FIG. 4 is a schematic view illustrating the structure of the data stored in the commodity information file 40. As shown in FIG. 4, a plurality of commodity information records including the commodity ID, commodity name, unit price, short distance status ds1, intermediate distance status ds2 and long distance status ds3 are store in the commodity information file 40. The commodity ID is a unique code for distinguishing each commodity individually. The commodity name and the unit price respectively refer to the name and the sales price per unit of the commodity specified with the corresponding commodity ID.

The short distance status ds1 is marked as "X" if the feature amount data obtained from the reference image of the commodity specified with the corresponding commodity ID is not yet set in the short-distance recognition dictionary file 31, "O" if the feature amount data is set, or "-" if the feature amount data is not required to be set. The intermediate distance status ds2 is marked as "X" if the same feature amount data is not yet set in the intermediate-distance recognition dictionary file 32, "O" if the feature amount data is set, or "-" if the feature amount data is not required to be set. The long distance status ds3 is marked as "X" if the same feature amount data is not yet set in the long-distance recognition dictionary file 33, "O" if the feature amount data is set, or "-" if the feature amount data is not required to be set.

In the following description, the three statuses of the short distance status ds1, the intermediate distance status ds2 and the long distance status ds3 are collectively referred to as a distance-classified setting status.

The POS terminal 2 has a maintenance mode of the commodity information file 40, a commodity recognition mode and a recognition dictionary creation mode. A user can select one of these modes through operation of the keyboard 11 or the touch panel 12.

In the maintenance mode, the POS terminal 2 can add a new commodity information record to the commodity information file 40. For example, in a case of selling a new product, the user adds a new commodity information record relating to the new product to the commodity information file 40. At the time of adding the new commodity, the feature amount data obtained from the reference image of the new product is not set in each of the distance-classified files 31~33. Therefore, the distance-classified setting statuses ds1, ds2 and ds3 of the new commodity information record are marked as "X" (not yet be set). However, for example, in a case of a commodity which is big in size and therefore whole of the commodity is hardly photographed just at the setting distance d1, the distance-classified setting status ds1 is marked as "-" (not required to be set). Similarly, in a case of a commodity which is small in size and therefore the appearance feature amount cannot be obtained from the image captured at the setting distance d3, the distance-classified setting status ds3 is marked as "-" (not required to be set).

In the maintenance mode, the POS terminal 2 can change the mark "O" (set) of the distance-classified setting statuses ds1~ds3 of the commodity information record to the mark "X" (not yet be set), or change the mark "-" (not required to be set) to the mark "X" (not yet be set). For example, in a case in which the recognition rate of the feature amount data corresponding to the setting status in a set state (marked as "O") is low, the user changes the mark of the setting status from "O" (set) to "X" (not yet be set). In this way, the feature amount data can be reregistered in the recognition dictionary creation mode (described later) of the scanner apparatus 1.

Figure 5:
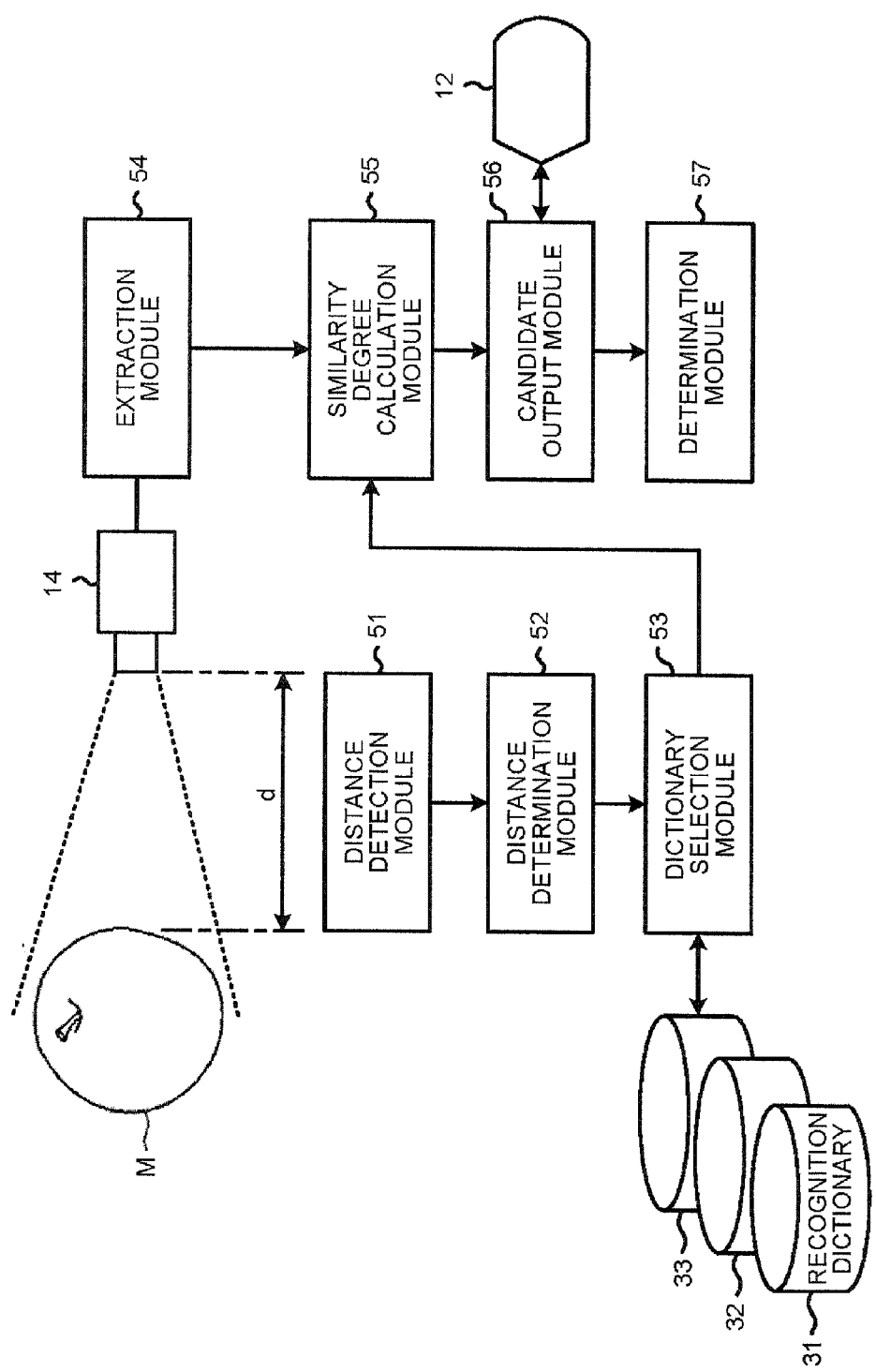
FIG. 5 is a block diagram illustrating the functional components of the scanner apparatus in a case of operating as a commodity recognition apparatus.
Figure 7:
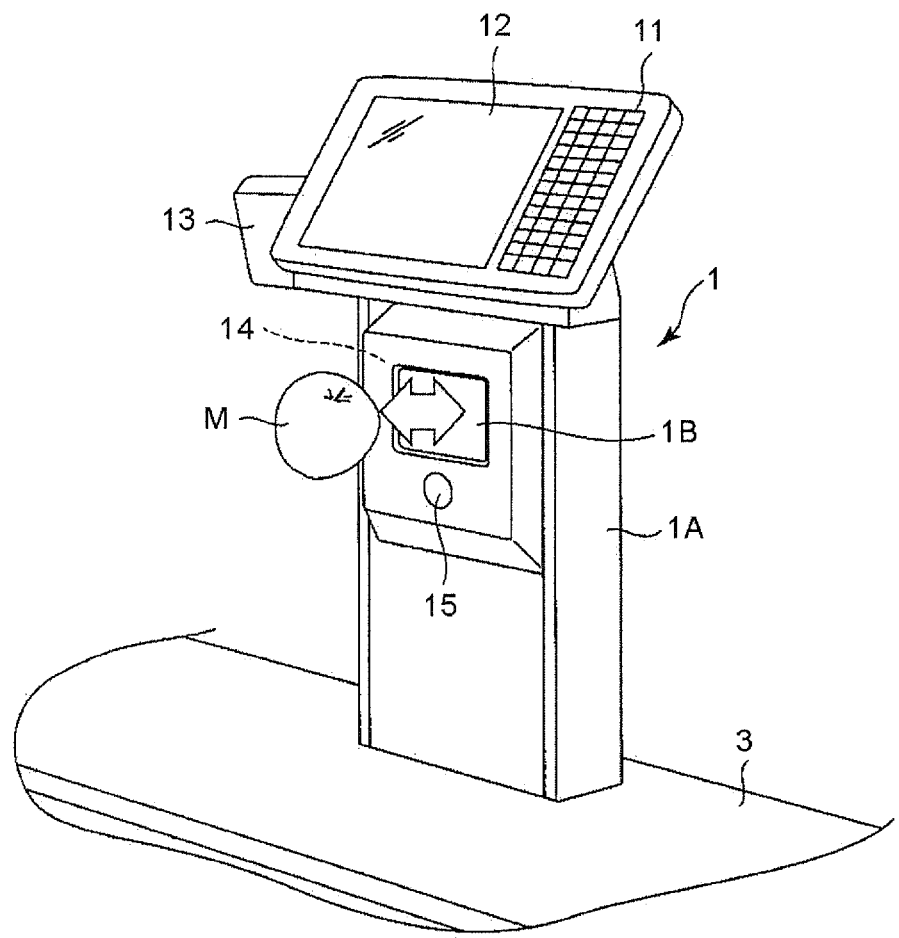
FIG. 7 is a schematic view illustrating a state in which a commodity is held over the scanner apparatus.

FIG. 5 is a block diagram illustrating the functional components of the scanner apparatus 1 when operating as the commodity recognition apparatus. In a case of recognizing a commodity M purchased by a customer, using the scanner apparatus 1, the user operates the keyboard 11 or the touch panel 12 to select the commodity recognition mode. Then the operator holds, as shown in FIG. 7, the commodity M to the reading window 1B.

When the commodity recognition mode is selected, the commodity recognition program is started in the scanner apparatus 1. Then the CPU 111 realizes, according to the commodity recognition program, the functions as a distance detection module 51, a distance determination module 52, a dictionary selection module 53, an extraction module 54, a similarity degree calculation module 55, a candidate output module 56 and a determination module 57. Hereinafter, each of these functions is described in detail.

When the commodity M is held to the reading window 1B, the CPU 111 functions as the distance detection module 51. The CPU 111 acquires the distance data output from the distance sensor 15 as a measured distance d from the image capturing section 14 to the commodity M. When the measured distance d is acquired, the CPU 111 functions as the distance determination module 52. The CPU 111 determines which one of the setting distances d1, d2 and d3 respectively set in the short-distance recognition dictionary file 31, the intermediate-distance recognition dictionary file 32 and the long-distance recognition dictionary file 33 of the recognition dictionary file 30 is close to the measured distance d.

When the setting distance d1, d2 or d3 close to the measured distance d is specified, the CPU 111 functions as the dictionary selection module 53. The CPU 111 selects a recognition dictionary file 30 corresponding to the setting distance specified to be close to the measured distance d. For example, if the setting distance d1 is specified, the CPU 111 selects the short-distance recognition dictionary file 31. If the setting distance d2 is specified, the CPU 111 selects the intermediate-distance recognition dictionary file 32. If the setting distance d3 is specified, the CPU 111 selects the long-distance recognition dictionary file 33.

Further, when the commodity M is held to the reading window 1B, the CPU 111 functions as the extraction module 54. The CPU 111 extracts, from an image captured by the image capturing section 14, the appearance feature amount such as the shape, surface hue, pattern, concave-convex state and the like of the commodity M imaged in the captured image. When the appearance feature amount is extracted, the CPU 111 functions as the similarity degree calculation module 55. The CPU 111 compares the appearance feature amount extracted by the extraction module 54 with each of the feature amount data for each commodity in the recognition dictionary file 30 selected by the dictionary selection module 53 in sequence to calculate a similarity degree indicating how much similar the appearance feature amount is to the feature amount data for each commodity registered in the dictionary.

When the similarity degree of each commodity is calculated, the CPU 111 functions as the candidate output module 56. The CPU 111 outputs the first five (for example) commodities in the descending order of similarity degree as the recognition commodity candidates to display them on the touch panel 12 in a selectable manner. When the recognition commodity candidates are displayed, the CPU 111 functions as the determination module 57. The CPU 111 determines the commodity selected from the recognition commodity candidates through an input-operation (selection) on the keyboard 11 or the touch panel 12 as the commodity purchased by the customer. Alternatively, the CPU 111 determines the commodity having the highest similarity degree within the recognition commodity candidates as the commodity purchased by the customer.

The sales data of the determined commodity is sent to the POS terminal 2 via the communication cable 8. In this way, the sales data of the commodity determined by the determination module 57 is registered in the POS terminal 2.

Figure 6:
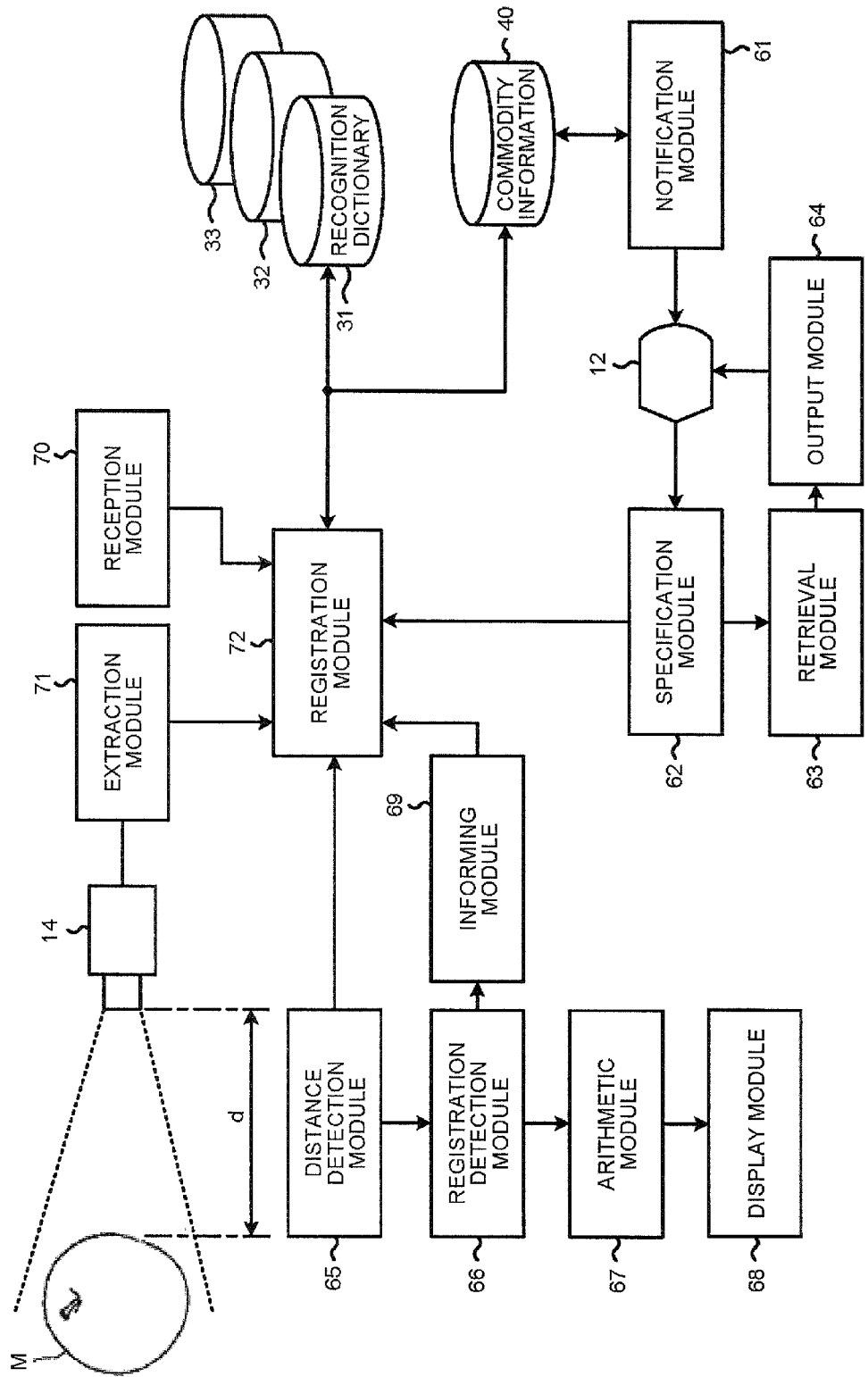
FIG. 6 is a block diagram illustrating the functional components of the scanner apparatus in a case of operating as a recognition dictionary creation apparatus.

FIG. 6 is a block diagram illustrating the functional components of the scanner apparatus 1 when operating as the recognition dictionary creation apparatus. In a case of registering the recognition dictionary data of the commodity M in the recognition dictionary file 30, the user operates the keyboard 11 or the touch panel 12 to select the recognition dictionary creation mode.

Figure 8:
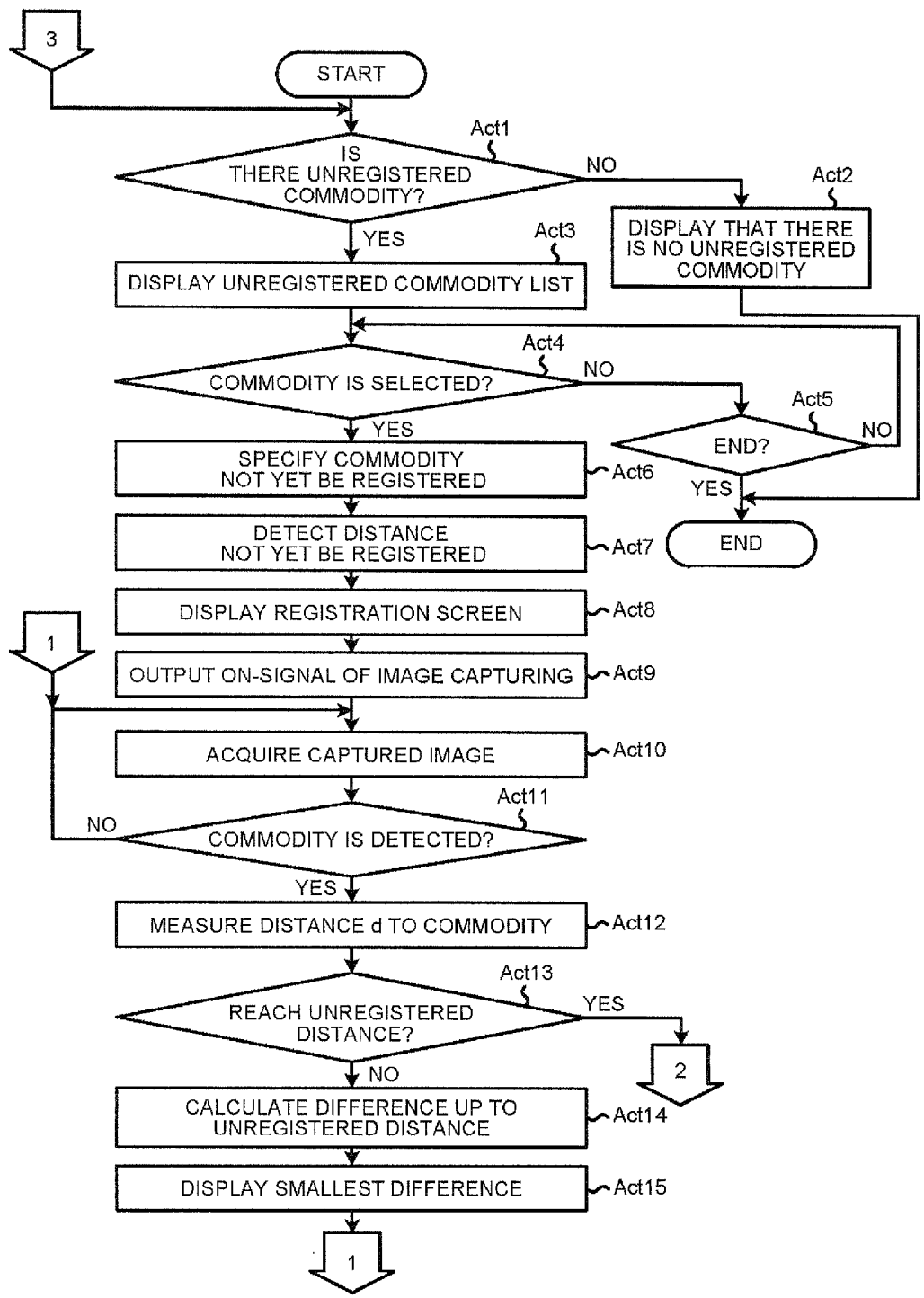
FIG. 8 is a flowchart illustrating a procedure of an information processing executed by a CPU of the scanner apparatus according to a recognition dictionary creation program.
Figure 9:
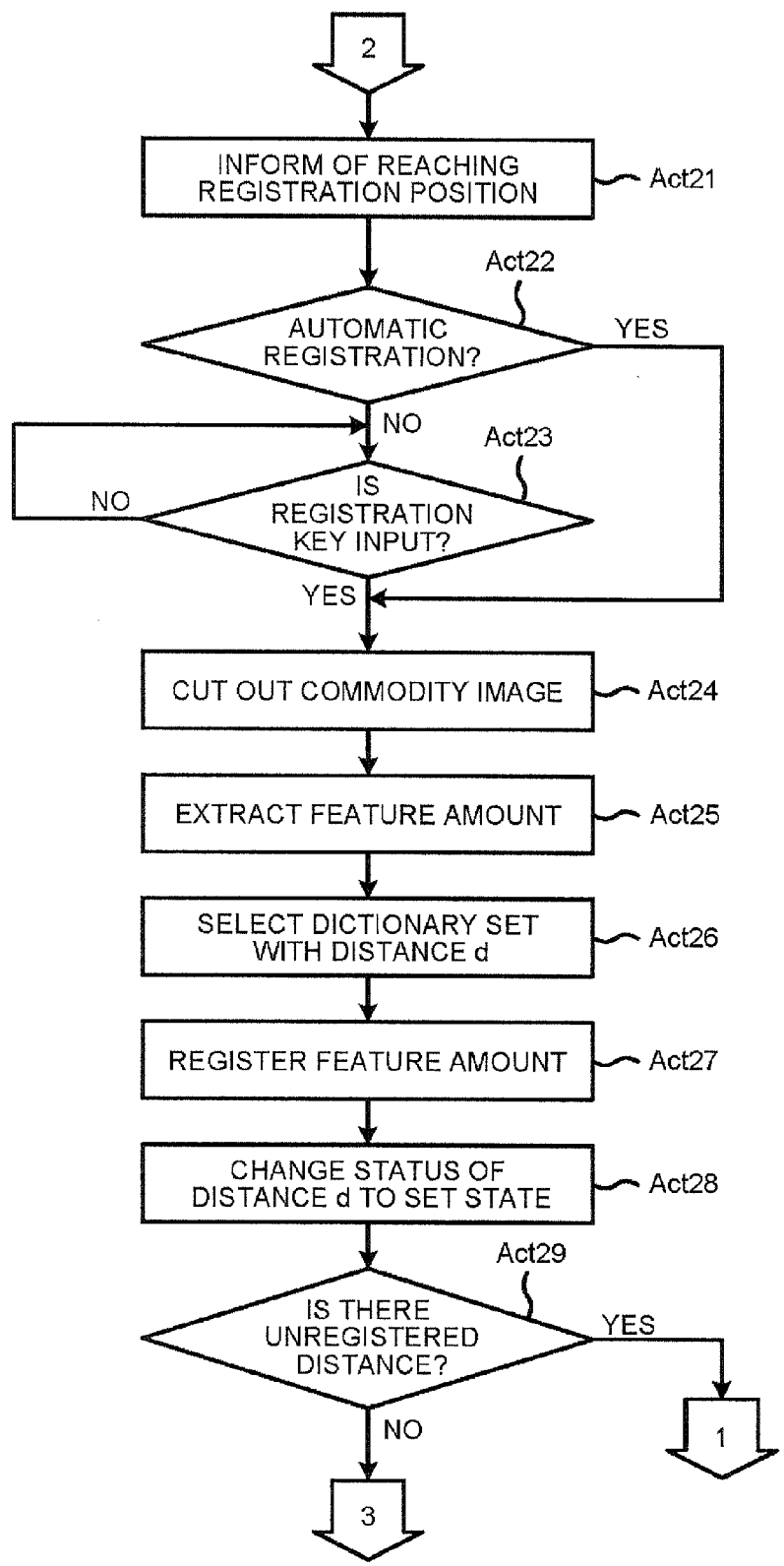
FIG. 9 is a flowchart illustrating a procedure of the information processing executed by the CPU of the scanner apparatus according to the recognition dictionary creation program.

When the recognition dictionary creation mode is selected, the recognition dictionary creation program is started in the scanner apparatus 1. Then the CPU 111 realizes, according to the recognition dictionary creation program, the functions as a notification module 61, a specification module 62, a retrieval module 63, an output module 64, a distance detection module 65, a registration detection module 66, an arithmetic module 67, a display module 68, an informing module 69, a reception module 70, an extraction module 71 and a registration module 72. Hereinafter, each function is described in detail with reference to the flowcharts in FIG. 8 and FIG. 9. In addition, the content of the processing described below and the processing in FIG. 8 and FIG. 9 are shown as one example, and thus various processing in which the same or similar result can be obtained may be utilized properly.

When the recognition dictionary creation program is started, the CPU 111 retrieves the commodity information file 40. Then the CPU 111 confirms whether or not there is a commodity information record of which at least one of the distance-classified setting statuses ds1, ds2 and ds3 is not yet set (marked as "X") (ACT 1). In a case in which none of the distance-classified setting statuses ds1, ds2 and ds3 of all the commodity information records is not yet set (marked as "X") (NO in ACT 1), the CPU 111 displays a screen that notifies the user that there is no unregistered commodity on the touch panel 12 (ACT 2), and then the processing is ended.

In a case in which there is a commodity information record of which at least one of the distance-classified setting statuses ds1, ds2 and ds3 is not yet set (marked as "X") (YES in ACT 1), the CPU 111 functions as the notification module 61 to notify the user that there is an unregistered commodity. The CPU 111 creates an unregistered commodity list 81 in which the commodity name and the distance-classified setting statuses ds1, ds2 and ds3 of the commodity information record of which at least one of the distance-classified setting statuses ds1, ds2 and ds3 is not yet set (marked as "X") are listed, and then displays the unregistered commodity list 81 on the touch panel 12 (ACT 3).

An example of the display of a screen 80 of the unregistered commodity list 81 is shown in FIG. 10. In this example, the feature amount data of a commodity named "Apple (Fuji)" is not yet set in the short-distance recognition dictionary file 31, the intermediate-distance recognition dictionary file 32 and the long-distance recognition dictionary file 33; the feature amount data of a commodity named "Watermelon" is not yet set in the intermediate-distance recognition dictionary file 32 and the long-distance recognition dictionary file 33; and the feature amount data of a commodity named "Orange" is not yet set in the short-distance recognition dictionary file 31. The commodity name of the unregistered commodity list 81 can be selected through a touch operation. Further, an "end" button 82 is also displayed on the screen of the unregistered commodity list 81. The CPU 111 enters a standby state until the commodity name is selected or the "end" button 82 is touched (ACT 4, ACT 5).

The user selects a registration target commodity from the commodities displayed in the unregistered commodity list 81, and then touches the commodity name on the screen. Then, the user holds, as shown in FIG. 7, the registration target commodity M to the reading window 1B. In a case in which there is no registration target commodity M, the user touches the "end" button 82. If the "end" button 82 is touched (YES in ACT 5), the CPU 111 erases the screen 80 of the unregistered commodity list 81, and then the processing is ended.

In a case in which the registration target commodity M is selected (YES in ACT 4), the CPU 111 functions as the specification module 62 to specify the commodity photographed by the image capturing section 14. The CPU 111 specifies the commodity corresponding to the touched commodity name as the registration target commodity M to acquire the commodity information record containing the commodity name from the commodity information file 40 and then stores the commodity information record in the RAM 114 (ACT 6).

When the registration target commodity M is specified, the CPU 111 functions as the retrieval module 63 to retrieve the distance in the recognition dictionary file 30 in which the feature amount data of the commodity M is not yet registered and also functions as the output module 64 to output the result of the retrieval. The CPU 111 checks the distance-classified setting statuses ds1, ds2 and ds3 of the commodity information record stored in the RAM 114. Then the CPU 111 detects the distance d1, d2 or d3 corresponding to the distance-classified setting status ds1, ds2 or ds3 which is not yet set (marked as "X") as the unregistered distance (ACT 7), and displays a registration screen 90 indicating the information of the unregistered distance on the touch panel 12 (ACT 8).

Figure 12:
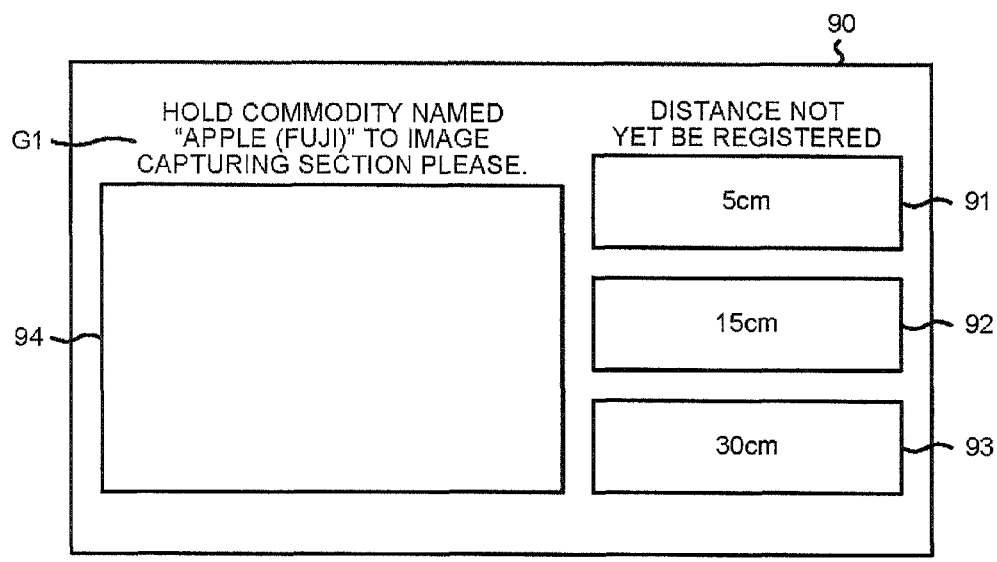
FIG. 12 is a schematic view illustrating one example of the transition of a registration screen.

One example of the display of the registration screen 90 is shown in FIG. 12. This example illustrates a registration screen 90 in a case in which the commodity named "Apple (Fuji)" is selected in the unregistered commodity list 81. The feature amount data of the commodity named "Apple (Fuji)" is not yet set in the short-distance recognition dictionary file 31, the intermediate-distance recognition dictionary file 32 and the long-distance recognition dictionary file 33. Therefore, on the registration screen 90, d1=5 cm, d2=15 cm and d3=30 cm are all displayed as the information of the unregistered distance 91, 92 and 93. Further, in the registration screen 90, an area 94 is formed to display the image captured by the image capturing section 14, and a guidance G1 is displayed nearby the area 94 to guide the user to hold the commodity named "Apple (Fuji)" to the image capturing section 14.

When the registration screen 90 is displayed, the CPU 111 outputs an ON-signal of image capturing to the image capturing section 14 (ACT 9). The image capturing section 14 starts the image capturing operation of the image capturing area in response to the ON-signal of image capturing. The frame images of the image capturing area captured by the image capturing section 14 are stored in the RAM 114 in sequence.

After outputting the ON-signal of image capturing, the CPU 111 acquires the frame image stored in the RAM 114 (ACT 10). Then the CPU 111 confirms whether or not the commodity M is photographed in the frame image (ACT 11). More specifically, the CPU 111 extracts a contour line and the like from the binary image of the frame image. Sequentially, the CPU 111 tries to extract the contour of the object imaged in the frame image. If the contour of the object is extracted, the CPU 111 regards the image in the contour as the commodity M.

If the commodity M is not photographed in the frame image (NO in ACT 11), the CPU 111 acquires a next frame image from the RAM 114 (ACT 10). Then the CPU 111 confirms whether or not the commodity M is photographed in the frame image (ACT 11).

If the commodity M is photographed in the frame image (YES in ACT 11), the CPU 111 functions as the distance detection module 65 to acquire the distance from the image capturing section 14 to the commodity M photographed by the image capturing section 14. The CPU 111 acquires the distance data output from the distance sensor 15 as the measured distance d from the image capturing section 14 to the commodity M (ACT 12). After the measured distance d is acquired, the CPU 111 functions as the registration detection module 66 to detect that the measured distance d is a given registration distance. The CPU 111 determines whether or not the measured distance d is consistent with one of the unregistered distances detected in the processing in ACT 7 (ACT 13).

If the measured distance d is not consistent with any one of the unregistered distances (NO in ACT 13), the CPU 111 functions as the arithmetic module 67 to calculate a movement distance dx of the commodity M which is required to achieve that the measured distance d is consistent with the given registration distance, and then functions as the display module 68 to display the calculated movement distance dx. The CPU 111 calculates the difference between the measured distance d and the unregistered distance (ACT 14). The CPU 111 displays, on the registration screen, the smallest difference within the differences between the measured distance d and the unregistered distances as the calculated movement distance dx (ACT 15). After that, the CPU 111 acquires a next frame image from the RAM 114 (ACT 10), and then executes the processing following ACT 11.

If it is detected that the measured distance d is consistent with one of the unregistered distances (YES in ACT 13), the CPU 111 functions as the informing module 69 to inform that the measured distance d reaches a given registration distance (refer to FIG. 9). The CPU 111 displays guidance on the registration screen 90 to inform the user that the measured distance d is consistent with one of the unregistered distances (ACT 21).

The CPU 111 determines whether or not an automatic registration mode is set (ACT 22). The scanner apparatus 1 has an automatic registration mode and a manual registration mode as operation modes in a case in which it operates as the recognition dictionary creation apparatus, and as an option, one of the automatic registration mode and the manual registration mode is set in advance. The operation mode can be properly changed by the user.

If the automatic registration mode is set (YES in ACT 22), the CPU 111 functions as the registration module 72. On the contrary, if the manual registration mode is set (NO in ACT 22) the CPU 111 waits for until a registration key is operated (ACT 23). The registration key is arranged on the keyboard 11. Alternatively, the registration key may be displayed on the registration screen only in the manual registration mode. If the registration key is operated (YES in ACT 23), the CPU 111 functions as the registration module 72.

The registration module 72 registers, in the recognition dictionary file 30, the appearance feature amount extracted by the extraction module 71 in association with the distance data as the feature amount data of the commodity M, which is specified by the specification module 62, at the distance measured by the measurement module (distance sensor 15). The CPU 111 cuts out the commodity image from the frame image in which the commodity M is detected in the processing in ACT 11 (ACT 24). Then the CPU 111 extracts the appearance feature amount such as the shape, surface hue, pattern, concave-convex state and the like of the commodity M from the commodity image (ACT 25: extraction module 71). Further, the CPU 111 selects the recognition dictionary file 31, 32 or 33 in which the measured distance d determined to reach the distance not yet be registered in the processing in ACT 13 is set as the setting distance (ACT 26). Then the CPU 111 registers the commodity ID and the commodity name of the commodity information record stored in the RAM in the processing in ACT 6 in the recognition dictionary file 31, 32 or 33 selected in the processing in ACT 26 in association with the feature amount data extracted in the processing in ACT 25 (ACT 27). Further, the CPU 111 changes the mark "X" (not yet be set) of the distance-classified setting status ds1, ds2 or ds3 coincident with the measured distance d of the commodity information record stored in the RAM in the processing in ACT 6 to the mark "O" (registered). Then the CPU 111 overwrites the commodity information record in the commodity information file 40 (ACT 28).

Sequentially, the CPU 111 determines whether or not there is a mark "X" (not yet be set) in the distance-classified setting statuses ds1, ds2 and ds3 of the commodity information record stored in the RAM 114 (ACT 29). If there is a distance-classified setting status which is marked as "X" (not yet be set) (YES in ACT 29), the CPU 111 returns to the processing in ACT 10. If there is no distance-classified setting status which is marked as "X" (not yet be set) (NO in ACT 29), the CPU 111 returns to the processing in ACT 1.

Figure 13:
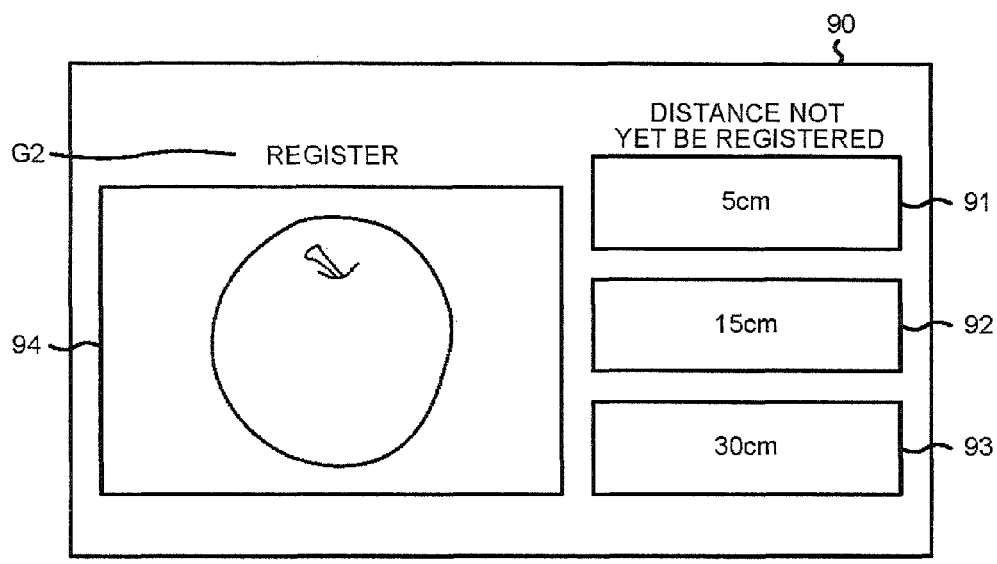
FIG. 13 is a schematic view illustrating one example of the transition of the registration screen.

In the state in which the registration screen 90 shown in FIG. 12 is displayed, it is exemplified that the distance d measured by the distance sensor 15 is 5 cm when the user holds the commodity named "Apple (Fuji)" to the image capturing section 14. In this case, as the flow proceeds to "YES" in the determination processing in ACT 13, the registration screen 90 is updated to the screen shown in FIG. 13. That is, the guidance G2 ("register", for example) is displayed on the registration screen 90 to inform the user that the measured distance d is consistent with one of the distances not yet be set.

If the automatic registration mode is set, the processing from ACT 24 to ACT 28 is executed automatically in the scanner apparatus 1. On the other hand, if the manual registration mode is set, the user operates the registration key. In this way, the processing from ACT 24 to ACT 28 is executed in the scanner apparatus 1.

As a result, the feature amount data of the commodity named "Apple (Fuji)" obtained from the reference image which is obtained by photographing the commodity named "Apple (Fuji)" at a distance of 5 cm away from the image capturing section 14 is registered in the short-distance recognition dictionary file 31. Further, the mark "X" (not yet be set) of the short distance status ds1 of the commodity information record relating to the commodity named "Apple (Fuji)" is updated to the mark "O" (set).

Figure 14:
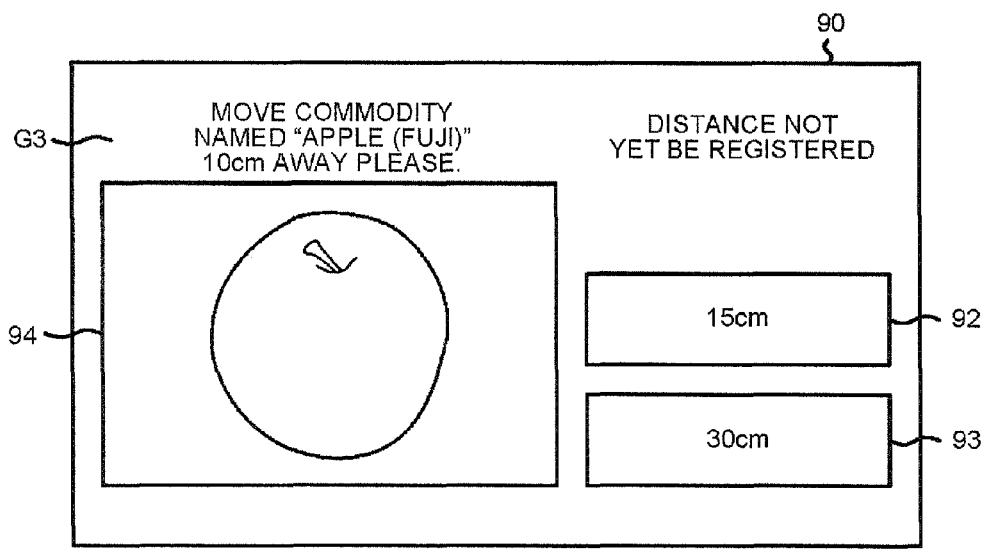
FIG. 14 is a schematic view illustrating one example of the transition of the registration screen.

At this time, in the distance-classified setting statuses ds1~ds3 of the commodity information record relating to the commodity named "Apple (Fuji)", the short distance status ds1 is marked as "O" (set state), while the intermediate distance status ds2 and the long distance status ds3 are still marked as "X" (not yet be set state). Therefore, as shown in FIG. 14, on the registration screen 90, d2=15 cm and d3=30 cm are displayed as the information of the distance not yet be registered 92 and 93. Further, guidance G3 is displayed nearby the area 94 to notify the user that the movement distance dx (the smallest difference within the differences between the measured distance d and the distances not yet be registered) is 10 cm.

Figure 15:
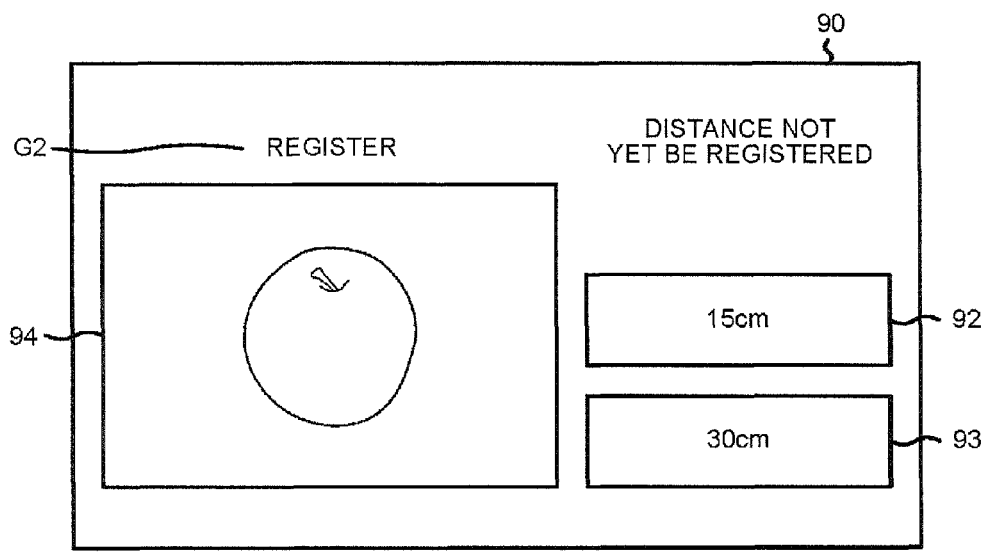
FIG. 15 is a schematic view illustrating one example of the transition of the registration screen.

Therefore, the user moves the commodity named "Apple (Fuji)" little by little away from the reading window 1B according to the guidance G3. If the measured distance d reaches 15 cm, the user stops moving the commodity named "Apple (Fuji)" away from the reading window 1B because the guidance G2 is displayed on the registration screen 90, as shown in FIG. 15. Then, in a case of manual registration mode, the user operates the registration key. Otherwise (in a case of automatic registration mode), the user is not required to operate the registration key. In this way, the feature amount data of the commodity named "Apple (Fuji)" obtained from the reference image which is obtained by photographing the commodity named "Apple (Fuji)" at a distance of 15 cm away from the image capturing section 14 is registered in the intermediate-distance recognition dictionary file 32. Further, the mark "X" (not yet be set) of the intermediate distance status ds2 of the commodity information record relating to the commodity named "Apple (Fuji)" is updated to the mark "O" (set).

At this time, in the distance-classified setting statuses ds1~ds3 of the commodity information record relating to the commodity named "Apple (Fuji)", the short distance status ds1 and the intermediate distance status ds2 are marked as "O" (set state), while the long distance status ds3 is still marked as "X" (not yet be Therefore, on the registration screen 90, d3=30 cm is displayed as the information of the distance not yet be registered. Further, the guidance G3 is displayed nearby the area 94 to notify the user of the movement distance dx=15 cm.

Therefore, the user moves the commodity named "Apple (Fuji)" further away from the reading window 1B according to the guidance G3. If the measured distance d reaches 30 cm, the user stops moving the commodity named "Apple (Fuji)" away from the reading window 1B because the guidance G2 is displayed on the registration screen 90. Then, in a case of manual registration mode, the user operates the registration key. Otherwise (that is, in a case of automatic registration mode), the user is not required to operate the registration key. In this way, the feature amount data of the commodity named "Apple (Fuji)" obtained from the reference image which is obtained by photographing the commodity named "Apple (Fuji)" at a distance of 30 cm away from the image capturing section 14 is registered in the long-distance recognition dictionary file 33. Further, the mark "X" (not yet be set) of the long distance status ds3 of the commodity information record relating to the commodity named "Apple (Fuji)" is updated to the mark "O" (set).

At this time, all the distance-classified setting statuses ds1~ds3 of the commodity information record relating to the commodity named "Apple (Fuji)" are marked as "O" (set state). Therefore, the screen of the touch panel 12 is switched from the registration screen 90 to the screen 80 of the unregistered commodity list 81. An example of the display of the screen 80 in this case is shown in FIG. 11. As shown in FIG. 11, the data of the commodity named "Apple (Fuji)" is erased from the unregistered commodity list 81.

Thereafter, the user carries out the same operation as stated above for the commodity named "Watermelon" and the commodity named "Orange", thereby registering the feature amount data of the commodity named "Watermelon" obtained from the reference image which is obtained by photographing the commodity named "Watermelon" at a distance of 15 cm away from the image capturing section 14 in the intermediate-distance recognition dictionary file 32, and also registering the feature amount data of the commodity named "Watermelon" obtained from the reference image which is obtained by photographing the commodity named "Watermelon" at a distance of 30 cm away from the image capturing section 14 in the long-distance recognition dictionary file 33. Further, the feature amount data of the commodity named "Orange" obtained from the reference image which is obtained by photographing the commodity named "Orange" at a distance of 5 cm away from the image capturing section 14 is registered in the short-distance recognition dictionary file 31.

In this way, according to the scanner apparatus 1 of the present embodiment, the short-distance recognition dictionary file 31, the intermediate-distance recognition dictionary file 32 and the long-distance recognition dictionary file 33 of the recognition dictionary file 30 can be created efficiently through such a simple operation that the user holds the commodity to the reading window 1B.

As stated above, the recognition dictionary data containing the feature amount data of the commodity obtained from the reference image which is obtained by photographing the commodity at a distance of 5 cm away from the image capturing section 14 is registered in the short-distance recognition dictionary file 31. The recognition dictionary data containing the feature amount data of the commodity obtained from the reference image which is obtained by photographing the commodity at a distance of 15 cm away from the image capturing section 14 is registered in the intermediate-distance recognition dictionary file 32. Also the recognition dictionary data containing the feature amount data of the commodity obtained from the reference image which is obtained by photographing the commodity at a distance of 30 cm away from the image capturing section 14 is registered in the long-distance recognition dictionary file 33.

In a case in which the scanner apparatus 1 operates as the commodity recognition apparatus, if the distance from the image capturing section 14 to the commodity is about 5 cm when a cashier holds the commodity purchased by the customer to the reading window 1B, the appearance feature amount of the commodity extracted from the captured image is compared with the feature amount data of each commodity registered in the short-distance recognition dictionary file 31. On the contrary, if the distance from the image capturing section 14 to the commodity is about 30 cm, the appearance feature amount of the commodity extracted from the captured image is compared with the feature amount data of each commodity registered in the long-distance recognition dictionary file 33. Therefore, the commodity can be recognized from the captured image with a high recognition rate.

The scanner apparatus 1 of the present embodiment has the automatic registration mode and the manual registration mode as operation modes of a recognition dictionary creation processing, and the user can select either of the modes. In a case in which the automatic registration mode is selected, the workload of the user can be reduced because the user is not required to operate the registration key. In a case in which the manual registration mode is selected, the recognition dictionary data is not registered as long as the user does not operate the registration key, and thus, the user can select whether or not the recognition dictionary data of a given registration distance is registered in the recognition dictionary file 30.

The scanner apparatus 1 of the present embodiment calculates the movement distance of the commodity required to achieve that the measured distance by the distance sensor 15 is consistent with the given registration distance, and then displays the movement distance on the registration screen 90. In this way, the work efficiency of the user can be improved because the user can know how much distance the commodity held to the reading window 1B needs to be moved against the reading window 1B.

Further, the scanner apparatus 1 of the present embodiment retrieves, in the recognition dictionary file, the distance of the feature amount data of the commodity which is not yet registered in the registration dictionary file 30, and then displays the result of the retrieval on the registration screen 90. Therefore, the missing of data can be prevented because the user can easily know how many distances not yet be registered there are in the recognition dictionary file.

The present invention is not limited to the embodiment described above.

For example, in the embodiment described above, the scanner apparatus 1 functioning as the commodity recognition apparatus of a store checkout system is also enabled to have a function as the recognition dictionary creation apparatus; however, the scanner apparatus 1 may not include the function acting as the commodity recognition apparatus, but merely include the function as the recognition dictionary creation apparatus. In this case, instead of manually moving the commodity held to the reading window 1B towards or away from the reading window 1B by a user, for example, a table on which the commodity is placed may be moved towards or away from the reading window 1B by a driving mechanism, and the movement of the table is stopped when the measured distance d reaches the given registration distance, thereby realizing the automation of operation.

In the embodiment described above, the recognition dictionary file 30 includes three types, that is, the short-distance recognition dictionary file 31, the intermediate-distance recognition dictionary file 32 and the long-distance recognition dictionary file 33; however, the number of the types of the recognition dictionary file 30 is not limited to three. The recognition dictionary file 30 may include two types, that is, short distance and long distance recognition dictionary files, or four types only by differing the setting distance of each file.

In addition, the recognition dictionary file 30 is not limited to be divided according to different distances. For example, the recognition dictionary file 30 may be physically constituted with one file by adding the data of the setting distances d1~d3 to the recognition dictionary data.

In the embodiment, it is exemplified that the recognition dictionary file 30 is stored in the POS terminal 2. However, the storage place of the recognition dictionary file 30 is not limited to the POS terminal 2. For example, the recognition dictionary file 30 may be stored in a server serving as an upper device of the POS terminal 2. Alternatively, the recognition dictionary file 30 may also be stored in the scanner apparatus 1 itself.

Further, the transfer of the recognition dictionary creation apparatus is generally carried out in a state where the programs such as the recognition dictionary creation program are stored in the ROM. However, the preset invention is not limited to this. The recognition dictionary creation program and the like transferred separately from a computer device may be written in a writable storage device of the computer device through an operation of a user and the like. The transfer of the recognition dictionary creation program and the like may be carried out by recording the program in a removable recording medium, or through a communication via a network. The form of the recording medium is not limited as long as the recording medium can store programs like a CD-ROM, a memory card and the like, and is readable by an apparatus. Further, the function realized by an installed or downloaded program can also be realized through the cooperation with an OS (Operating System) installed in the apparatus.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A recognition dictionary creation apparatus comprising:
an image capturing section configured to photograph a commodity at a distance apart from the image capturing section to capture an image of the commodity;
a distance sensor configured to measure the distance from the image capturing section to the commodity photographed by the image capturing section as a distance data;
a specification module configured to specify the commodity from the image captured by the image capturing section;
an extraction module configured to extract an appearance feature amount of the commodity from the image of the commodity captured by the image capturing section;
an informing module configured to inform the measured distance by the distance sensor;
a reception module configured to receive a registration declaration of a feature amount data; and
a registration module configured to register the appearance feature amount extracted by the extraction module in a recognition dictionary file in association with the distance data as a feature amount data of the commodity, which is specified by the specification module, at the distance measured by the distance sensor in response to the registration declaration received by the reception module.

2. The recognition dictionary creation apparatus according to claim 1, wherein the informing module configured to inform that the measured distance by the distance sensor reaches a given registration distance.

3. The recognition dictionary creation apparatus according to claim 2, further comprising:
an arithmetic module configured to calculate a movement distance of the commodity which is required to achieve that the measured distance by the distance sensor is consistent with the given registration distance; and
a display module configured to display the movement distance.

4. The recognition dictionary creation apparatus according to claim 1, further comprising:
a retrieval module configured to retrieve, in the recognition dictionary file, the distance of the feature amount data of the commodity, specified by the specification module, which is not yet registered in the recognition dictionary file; and an output module configured to output the retrieval result of the retrieval module.

5. A method for creating a recognition dictionary by a recognition dictionary creation apparatus having an image capturing section which captures image of a commodity at a distance apart from the image capturing section, and a distance sensor which measures the distance from the image capturing section to the commodity as a distance data, including:

specifying the commodity from the captured image;

extracting an appearance feature amount of the commodity from the captured image;

informing the measured distance by the distance sensor;

receiving a registration declaration of the feature amount data; and registering the extracted appearance feature amount in a recognition dictionary file in association with the distance data as a feature amount data of the specified commodity at the distance measured by the distance sensor in response to the registration declaration received.

6. The recognition dictionary creation apparatus according to claim 1, wherein the informing module informs a moving distance of the commodity which is detected while a distance measured by the distance sensor reaches a given registration distance.

7. A recognition dictionary creation apparatus comprising:

an image capturing section configured to photograph a commodity at a distance apart from the image capturing section to capture an image of the commodity;

a distance sensor configured to measure the distance from the image capturing section to the commodity photographed by the image capturing section as a distance data;

a specification module configured to specify the commodity from the image captured by the image capturing section;

an extraction module configured to extract an appearance feature amount of the commodity from the image of the commodity captured by the image capturing section;

a registration detection module configured to detect that the measured distance by the distance sensor is consistent with the given registration distance;

a registration module configured to register the appearance feature amount extracted by the extraction module in a recognition dictionary file in association with the distance data as a feature amount data of the commodity, which is specified by the specification module, at the distance measured by the distance sensor in response to a detection result that the measured distance is the given registration distance.

8. The recognition dictionary creation apparatus according to claim 7, further comprising:

a retrieval module configured to retrieve, in the recognition dictionary file, the distance of the feature amount data of the commodity, specified by the specification module, which is not yet registered in the recognition dictionary file; and an output module configured to output the retrieval result of the retrieval module.

* * * * *